（12）United States Patent
Ueno

(10) Patent No.: US 9,065,338 B2
(45) Date of Patent: Jun. 23, 2015

(54) MULTI-PHASE DC-DC CONVERTER SUPPLYING POWER TO LOAD WITH PLURAL POWER STAGES AND INFORMATION PROCESSING DEVICE INCLUDING THE SAME

(75) Inventor: Takeshi Ueno, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 144 days.

(21) Appl. No.: 13/491,974

(22) Filed: Jun. 8, 2012

(65) Prior Publication Data

US 2013/0049712 A1 Feb. 28, 2013

(30) Foreign Application Priority Data

Aug. 23, 2011 (JP) .................................. 2011-181876

(51) Int. Cl.
*G05F 1/00* (2006.01)
*H02M 3/158* (2006.01)

(52) U.S. Cl.
CPC .................................. *H02M 3/1584* (2013.01)
USPC ............................ 323/272; 323/271; 323/282

(58) Field of Classification Search
USPC .................................. 323/268–277, 282–285
See application file for complete search history.

(56) References Cited

U.S. PATENT DOCUMENTS

| 5,477,132 | A | * | 12/1995 | Canter et al. | 323/282 |
|---|---|---|---|---|---|
| 6,281,666 | B1 | * | 8/2001 | Tressler et al. | 323/272 |
| 6,414,470 | B1 | * | 7/2002 | Liu et al. | 323/272 |
| 6,628,106 | B1 | * | 9/2003 | Batarseh et al. | 323/222 |
| RE38,846 | E | * | 10/2005 | Walters et al. | 323/272 |
| 7,696,734 | B2 | | 4/2010 | Endo et al. | |
| 7,772,811 | B1 | * | 8/2010 | Jain et al. | 323/224 |
| 8,232,782 | B2 | * | 7/2012 | Houston et al. | 323/272 |
| 2008/0129260 | A1 | * | 6/2008 | Abu Qahouq et al. | 323/272 |

(Continued)

FOREIGN PATENT DOCUMENTS

| JP | 2006340442 A | 12/2006 |
|---|---|---|
| JP | 2007336688 A | 12/2007 |

(Continued)

OTHER PUBLICATIONS

A. Peterchev et al; Architecture and IC Implementation of a Digital VRM Controller; IEEE Transactions on Power Electronics, vol. 18, No. 1, Jan. 2003; pp. 356-364.

(Continued)

*Primary Examiner* — Adolf Berhane
*Assistant Examiner* — Gary Nash
(74) *Attorney, Agent, or Firm* — Holtz, Holtz, Goodman & Chick PC

(57) ABSTRACT

There is provided a DC-DC converter which converts an input voltage into an output voltage for supply to a load, in which an input terminal receives the input voltage, an output terminal outputs the output voltage, power stages each includes: a high side switch, a low side switch and an inductor, the control unit executes a first mode and a second mode wherein the first mode controls the high side switch and the low side switch in each of the power stages so that a ratio of an output current in each of the power stages to a load current flowing through the load becomes a set value and the second mode controls the high side switch and the low side switch in each of the power stages so that duty ratios of the high side switch and the low side switch are equalized among the power stages.

12 Claims, 7 Drawing Sheets

(56) References Cited

U.S. PATENT DOCUMENTS

| | | | |
|---|---|---|---|
| 2010/0033154 A1* | 2/2010 | Cheng et al. | 323/293 |
| 2010/0109621 A1* | 5/2010 | Lee | 323/268 |
| 2010/0295521 A1 | 11/2010 | Odaohhara | |

FOREIGN PATENT DOCUMENTS

| | | | |
|---|---|---|---|
| JP | 2008141802 A | 6/2008 | |
| JP | 2009077537 A | 4/2009 | |
| JP | 2009163948 A | 7/2009 | |
| JP | 2010178605 A | 8/2010 | |
| JP | 2011109871 A | 6/2011 | |

OTHER PUBLICATIONS

Japanese Office Action dated Jun. 27, 2014 issued in counterpart Japanese Application No. 2011-181876.

Japanese Office Action dated Mar. 24, 2015, issued in counterpart Japanese Application No. 2011-181876.

* cited by examiner

MULTI-PHASE DC-DC CONVERTER SUPPLYING POWER TO LOAD WITH PLURAL POWER STAGES AND INFORMATION PROCESSING DEVICE INCLUDING THE SAME

CROSS REFERENCE TO RELATED APPLICATIONS

This application is based upon and claims the benefit of priority from the prior Japanese Patent Application No. 2011-181876, filed on Aug. 23, 2011, the entire contents of which are incorporated herein by reference.

FIELD

The present disclosure relates to DC-DC conversion.

BACKGROUND

In a multi-phase DC-DC converter which supplies an electric current to a load by connecting a plurality of power stages each built up by a switch and an inductor, if there is dispersion of elements employed for the respective power stages, the currents supplied from the individual power stages do not become equal to each other.

At this time, a large current concentrates on a specified power stage, and such a possibility exists that the elements like the switch, the inductor, etc. in the power stage might be broken down. Further, even when not reaching the breakdown, there exists also a possibility of causing a decrease in inductance value of the inductor on which the current concentrate due to a DC superimposed characteristic of the inductor.

In order to eliminate influence thereof, a known feedback control method is a method of evenly balancing the respective currents in a way that observes the currents supplied to the load from the respective power stages.

On the other hand, it is known that duty ratios of the individual power stages may be evenly controlled in terms of conversion efficiency. At this time, the current supplied to the load depends on a parasitic resistance existing in a current path, and a current value becomes smaller as a resistance value gets larger. Accordingly, the currents, which are output by the power stages when the efficiency is maximized, are not equalized.

Thus, the conventional multi-phase DC-DC converter has such a problem that the conversion efficiency decreases when equalizing the currents output by the power stages in order to protect the elements.

DETAILED DESCRIPTION

According to an embodiment, there is provided a DC-DC converter which converts an input voltage into an output voltage having a value different that of the input voltage and supplies the output voltage to a load.

The DC-DC converter includes an input terminal, an output terminal, a plurality of power stages and a control unit.

The input terminal receives the input voltage.

The output terminal outputs the output voltage.

The plurality of power stages each includes: a high side switch one end of which is connected to the input terminal and; a low side switch one end of which is connected to an ground terminal and the other end of which is connected to the other end of the high side switch; and an inductor one end of which is connected to the other end of the high side switch and the other end of which is connected to the output terminal.

The control unit executes a first mode and a second mode.

The first mode controls the high side switch and the low side switch in each of the power stages so that a ratio of an output current from each of the power stages to a load current flowing through the load becomes a set value; and The second mode controls the high side switch and the low side switch in each of the power stages so that duty ratios of the high side switch and the low side switch are equalized among the power stages.

Hereinafter, in-depth descriptions of the embodiments will be made with reference to the drawings.

First Embodiment

Figure 1:
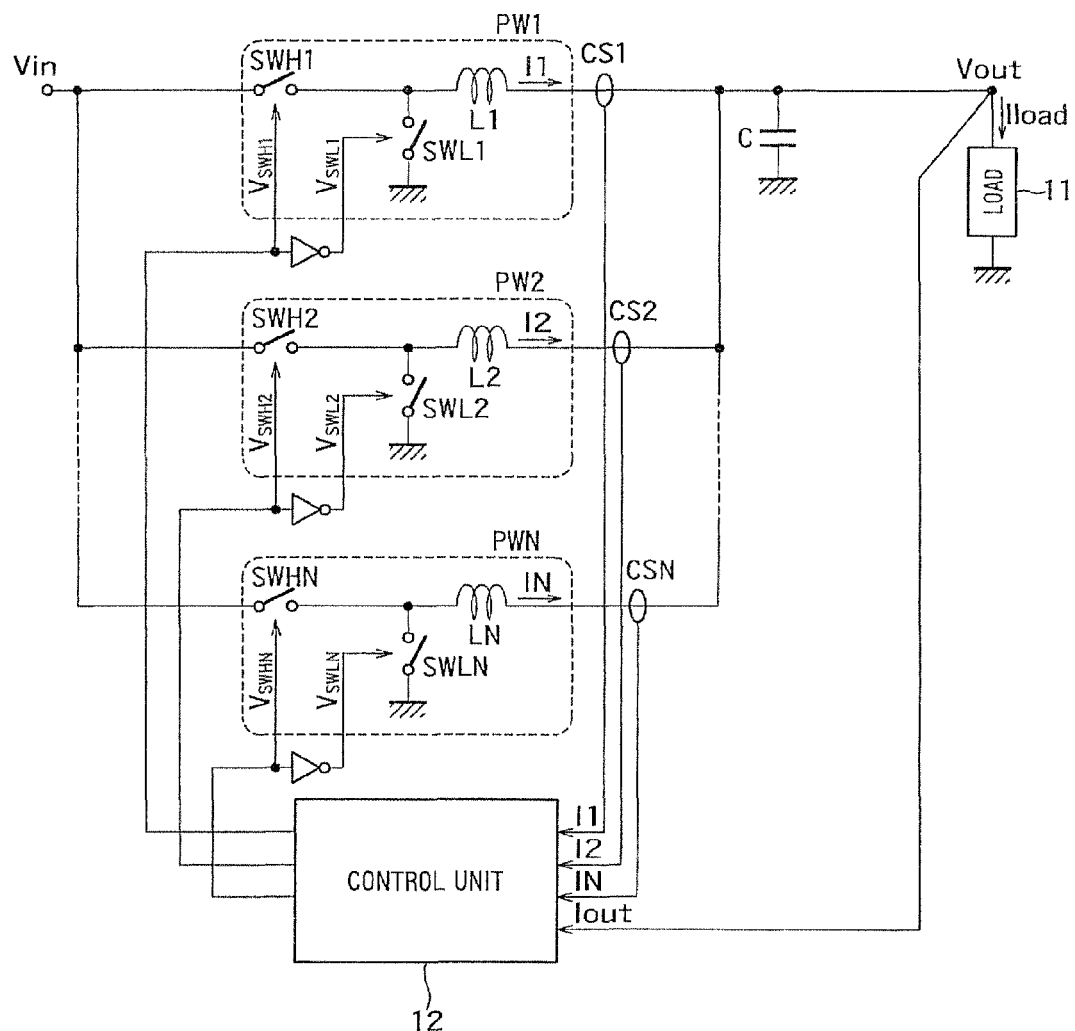
FIG. 1 is a block diagram of an information processing device including a multi-phase DC-DC converter according to a first embodiment and a load.

FIG. 1 illustrates a block diagram of an information processing device including a multi-phase DC-DC converter according to a first embodiment and a load.

Power stages PWi (i=1 ... N) are configured by high side switches SWHi (i=1 ... N), low side switches SWLi (i=1 ... N) and inductors Li (i=1 ... N). Power stages PWi convert input DC voltages Vin into output DC voltages Vout lower than Vin, and output currents Ii (i=1 ... N), respectively. All of the power stages are connected in parallel. The power stages output a synthesized current I1+I2+ ... +IN (load current Iload) to a smooth capacitor C connected in common to these power stages and to a load 11 connected in parallel to this capacitor. What is considered as the load 11 is exemplified by a CPU (Central Processing Unit), a memory, a battery, etc.

The high side switches SWHi (i=1 ... N) and the low side switches SWLi (i=1 ... N) are controlled by high side switch control signals $V_{SWHi}$ (i=1 ... N) and low side control signals $V_{SWLi}$ (i=1 ... N), respectively. The control signals $V_{SWHi}$ and $V_{SWLi}$ are complementary signals, in which the switch SWLi gets OFF when the switch SWHi is ON but gets ON when the switch SWHi is OFF. An inverter inverts the signal $V_{SWHi}$, thereby generating the signal $V_{SWLi}$.

A control unit 12, when the load current Iload is equal to or smaller than a threshold value, i.e., when the load is light, determines the signal $V_{SWHi}$ corresponding to only Vout and outputs this signal. The control unit 12, when Iload is larger than the threshold value, determines the signal $V_{SWHi}$ from Vout and Ii (i=1 . . . N) detected by a current detecting unit CSi (i=1 . . . N) and outputs this signal.

If Iload is equal to or smaller than the threshold value, it does not happen that the elements such as the switches and the inductors provided at the power stages are to be broken down even when the currents output by the respective power stages are not equal to each other, and hence there is no necessity for balancing the currents. At this time, a duty ratio of $V_{SWHi}$ (i=1 . . . N) is determined from Vout but is irrelevant to Ii (i=1 . . . N), in which the duty ratios of all of the power stages are equalized. This operation corresponds to a second mode. Conversion efficiency is thereby improved.

Whereas when Iload is larger than the threshold value, i.e., when the load is heavy, the output currents Ii (i=1 . . . N) in addition to Vout are observed, and the high side switch control signals $V_{SWHi}$ (i=1 . . . N) are individually set so that a ratio of the output current Ii (i=1 . . . N) of each power stage to the load current becomes a set value. This operation corresponds to a first mode.

Herein, an assumption is that the multi-phase DC-DC converter is configured by use of the same types of devices, and all the currents are evenly set equal to or smaller than the rated value by setting the control signals $V_{SWHi}$ (i=1 . . . N) individually to equalize all of the output currents Ii (i=1 . . . N) (to attain the same ratio of Ii (i=1 . . . N) to the load current). This contrivance can prevent the elements from being broken down and the inductance value from decreasing.

In the case of using the elements having different rated values in parallel, the respective currents may be set equal to or smaller than each individual rated value by setting the control signals $V_{SWHi}$ (i=1 . . . N) individually in a way that matches with this each rated value.

Thus, the control unit 12 selectively implements the second mode when the load is light and the first mode when the load is heavy in accordance with the output current of each power stage, the output voltage and the target voltage.

Note that the low side switch control signal is generated by the inverter's inverting the high side switch control signal in the first embodiment, however, the control unit 12 may directly generate the low side switch control signal.

The first embodiment discussed above enables the efficiency to be improved when the load is light and the devices to be protected when the load is heavy.

Second Embodiment

Figure 2:
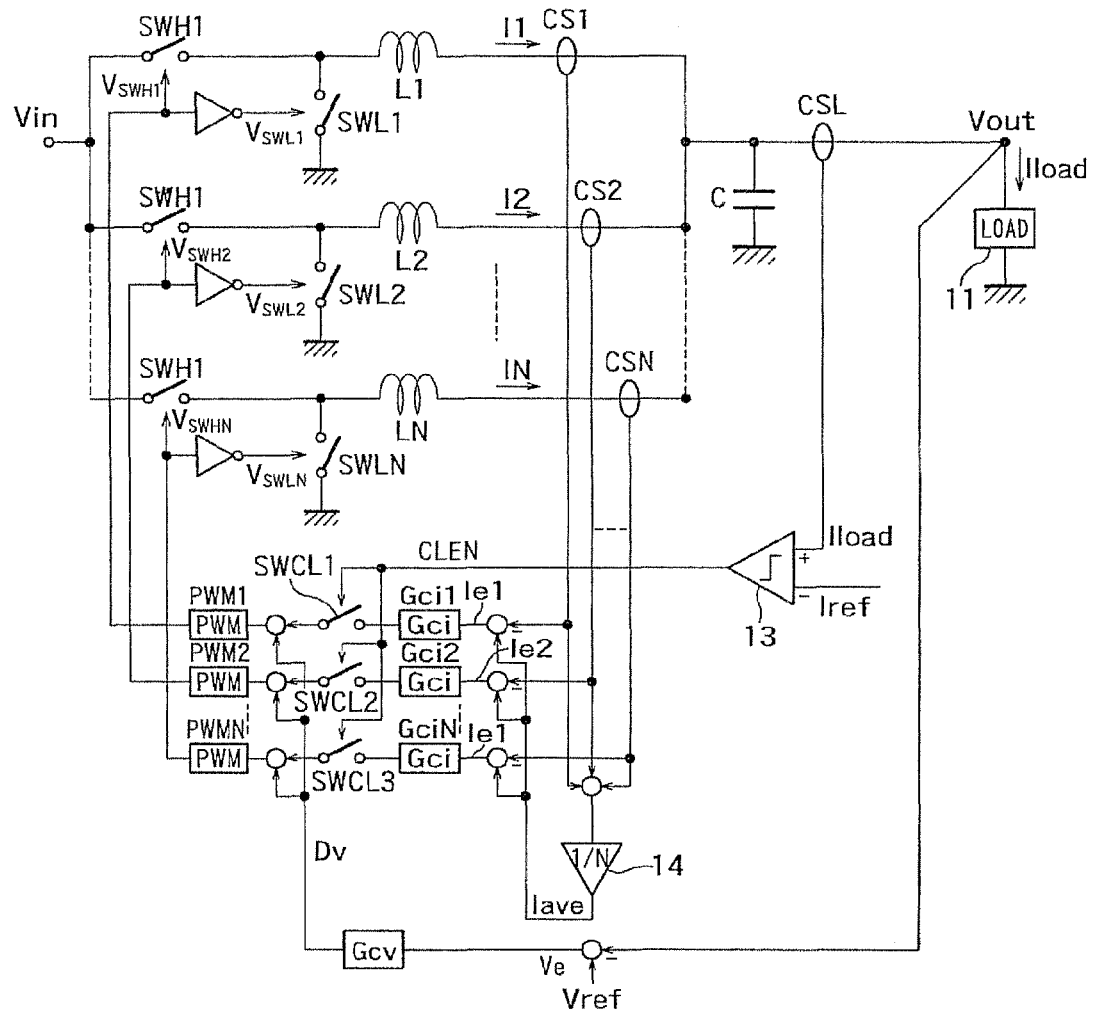
FIG. 2 is a block diagram of the information processing device including the multi-phase DC-DC converter according to a second embodiment and the load.

FIG. 2 depicts a block diagram of the information processing device including the multi-phase DC-DC converter according to a second embodiment and the load.

For adjusting the output voltage Vout to the target voltage (reference voltage) Vref, a differential voltage Ve between the target voltage Vref and the output voltage Vout is obtained as a duty signal via a compensator Gcv. The obtained duty signal Dv undergoes pulse width modulation (Pulse Width Modulation: PWM) with PWMi (i=1 . . . N) and is fed back as the high side switch control signal $V_{SWHi}$ (i=1 . . . N). the operation described so far stabilizes the output voltage Vout.

Next, a technique of averaging the currents Ii (i=1 . . . N) that are output by the respective power stages (see FIG. 1) will be described. The load current Iload is detected by a current detecting unit CSL and compared with a threshold value Iref by a comparator 13. If Iload>Iref, a current feedback loop enable signal CLEN defined as an output of the comparator 13 is set High. At this time, the switches SWCLi (i=1 . . . N) are turned ON, thus forming a current feedback loop.

The output currents Ii (i=1 . . . N) of the respective power stages are detected by the current detecting units CSi (i=1 . . . N), and a gain 14 obtains an average value Iave as follows:

$$I_{ave} = \frac{1}{N} \sum_{i=1}^{N} I_i \quad (1)$$

Further, differences Iei (i=1 . . . N) between Ii (i=1 . . . N) and Iave are given by:

$$Iei = Iave - Ii (i=1 . . . N) \quad (2)$$

These differences Iei are, after passing through the compensators Gci(i=1 . . . N), added to the duty signals Dv.

Now supposing that I1>Iave, the difference Ie1 becomes minus, an input to PWM1 decreases because of the output of the compensator Gci1 being reduced, and the duty of the signal $V_{SWH1}$ for driving the switch SWH1 decreases. That is, the feedback works in such a direction that I1 diminishes. Similarly, if I1<Iave, the feedback works in such a direction that I1 augments.

Thus, the load current Lload is larger than a preset threshold value, in which case the current feedback loop works, and the currents output by the respective power stages are averaged. Hence, even if there is dispersion in characteristics of the elements employed for the power stages, the currents are not concentrated on a specified power stage, the stable operation can be attained without breaking down the elements even when the large output current occurs.

The threshold value Iref of the load current may be set to, e.g., a rated current ILrated of the inductor for use. Supposing, in this case, that there occurs a state in which only an i-th power stage supplies all the load currents Iload due to the dispersion of the elements, the current value Ii of the current flowing to the inductor is ILrated, and hence it does not happen that the inductor is broken down.

Moreover, if a range of the dispersion of the elements can be predicted to some extent at a design time, a value smaller than ILrated may be set as the threshold value Iref corresponding to a magnitude of the dispersion of the elements.

Whereas if the load current is smaller than the threshold value, there flows none of the current that is large enough to break down the elements even when there is the dispersion of the elements, and therefore all the power stages are driven at the same duty by setting Low the current feedback loop enable signal CLEN. The conversion efficiency can be thereby enhanced.

As discussed above, it is controlled whether or not the output currents of the respective power stages are averaged based on the magnitude of the load current (i.e., whether the first mode or the second mode is selected), thereby making the protection of the elements when the high-load current flows compatible with the improvement of the efficiency when the low-load current flows.

Third Embodiment

Figure 3:
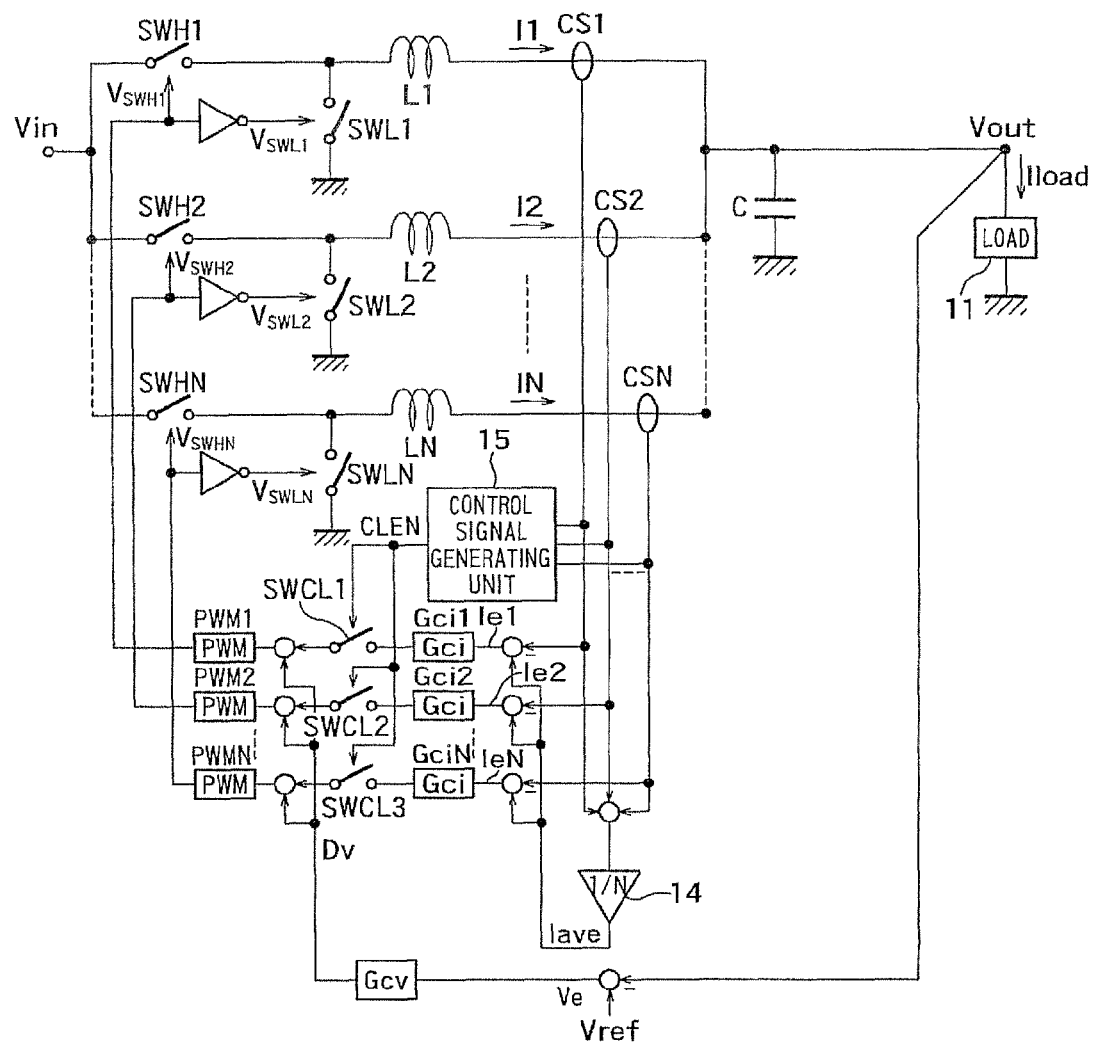
FIG. 3 is a block diagram of the information processing device including the multi-phase DC-DC converter according to a third embodiment and the load.

FIG. 3 illustrates a block diagram of the information processing device including the multi-phase DC-DC converter according to a third embodiment and the load.

In place of directly detecting the load current, a control signal generating unit 15 generates the current feedback loop enable signal CLEN from the output current Ii (i=1 . . . N) of each power stage.

Focusing on the DC component of the current, the current flowing to the smooth capacitor C can be ignored, and the load current is given such as:

$$I_{load} = \sum_{i=1}^{N} I_i \quad (3)$$

and hence, if the following relationship is established, $$\sum_{i=1}^{N} I_i > I_{Lrated} \quad (4)$$

it is feasible to perform the same operation as in the case of setting Iref=ILrated in FIG. 2 in a way that sets High the signal CLEN.

Alternatively, if the following relationship is established, $$\max(I_i) > I_{Lrated} \quad (5)$$

the currents are not averaged till the maximum inductor current reaches the rated value in a way that sets High the signal CLEN, and hence the current feedback loop does not work till reaching a much larger load current than in the case of using the formula (4). Accordingly, a duty constant operation is attained in a much wider current range, and the highly efficient conversion can be realized. Note that max(Ii) is defined as the maximum value in the output currents Ii (i=1 . . . N).

As described above, the third embodiment enables the determination as to whether the load is light or heavy without directly observing the load current.

Fourth Embodiment

Figure 4:
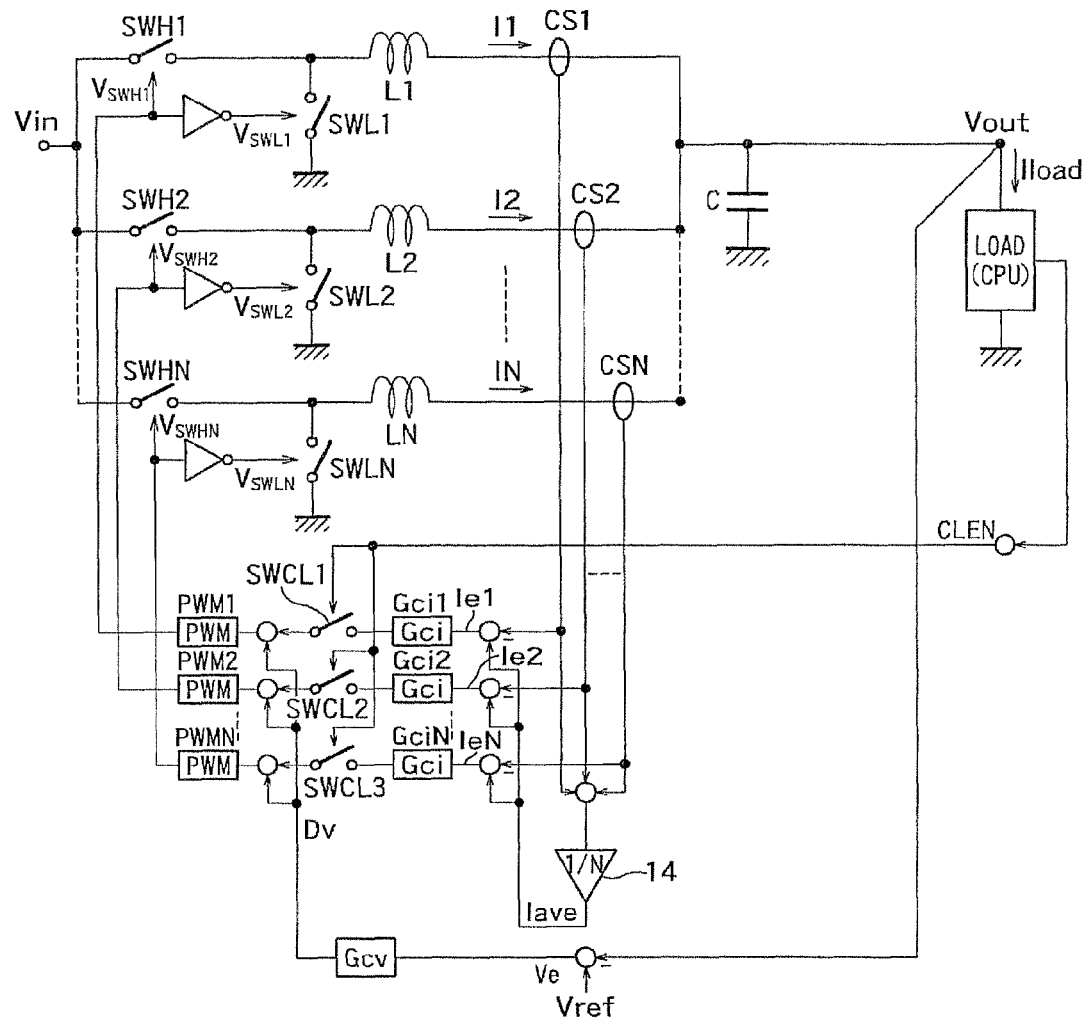
FIG. 4 is a block diagram of the information processing device including the multi-phase DC-DC converter according to a fourth embodiment and the load.

FIG. 4 illustrates a block diagram of the information processing device including the multi-phase DC-DC converter according to a fourth embodiment and the load.

In the fourth embodiment, the current feedback loop enable signal CLEN is inputted from the outside of the DC-DC converter. If the load of the current value to be required is known, it can be determined from the outside (load) whether the currents need to be averaged or not, and hence there becomes no necessity for detecting the load current as in the second embodiment. Further, there is no necessity for the control signal generating unit as in the third embodiment.

Note that when a CPU is connected as the load, since the majority of CPUs each have a function of outputting a signal representing a magnitude of a consumption current, this signal can be used as CLEN.

As discussed above, the fourth embodiment can eliminate the necessity for detecting the current inwardly of the DC-DC converter if the load current value is known on the load side.

Fifth Embodiment

Figure 5:
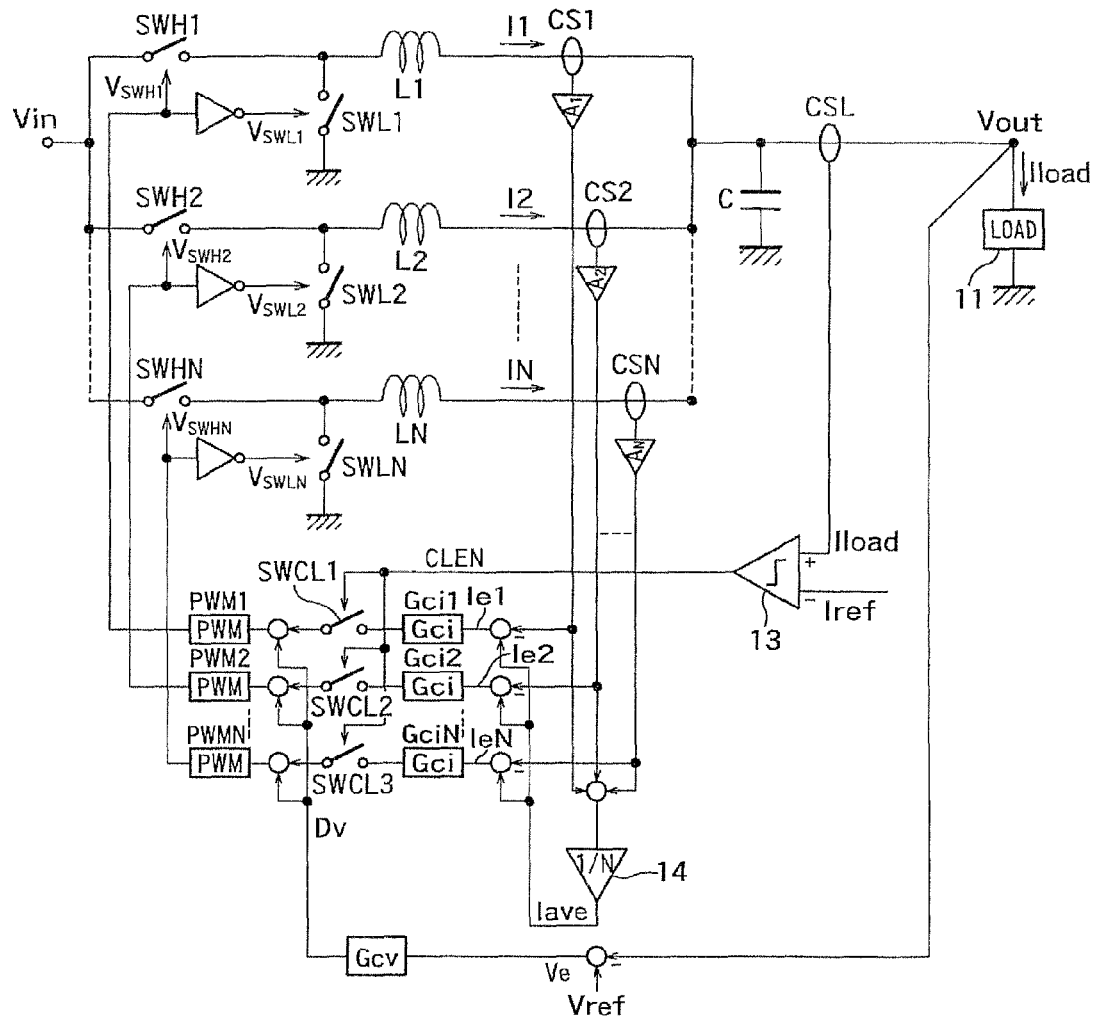
FIG. 5 is a block diagram of the information processing device including the multi-phase DC-DC converter according to a fifth embodiment and the load.

FIG. 5 depicts a block diagram of the information processing device including the multi-phase DC-DC converter according to a fifth embodiment and the load.

As compared with the third embodiment, gains Ai (i=1 . . . N) are added in rear of the current detectors CSi (i=1 . . . N).

The current feedback loop works so as to equalize the output currents Ii (i=1 . . . N) of the respective power stages to each other when the high-load current flows in the third embodiment, however, the fifth embodiment enables the output currents to be weighted by the gains Ai (i=1 . . . N).

For example, supposing that A1=2 and Ai=1 (i=2 . . . N), when the high-load current flows, the output current I1 can be controlled to become a half of each of other output currents Ii (i=2 . . . N). Accordingly, even when the elements for use have the rated values different from each other, the currents flowing to the individual elements can be controlled to be equal to or smaller than the rated values.

Sixth Embodiment

Figure 6:
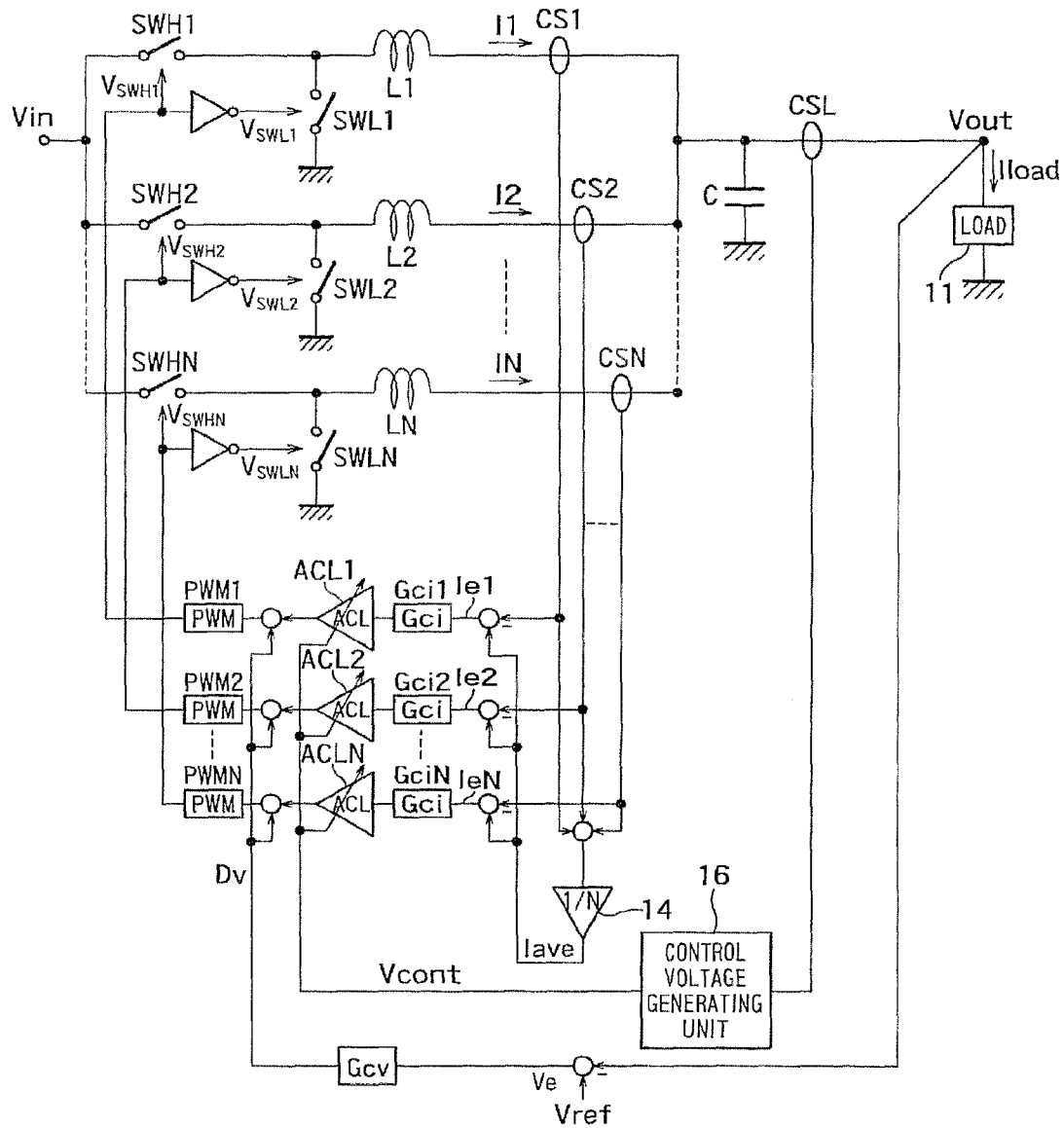
FIG. 6 is a block diagram of the information processing device including the multi-phase DC-DC converter according to a sixth embodiment and the load.

FIG. 6 depicts a block diagram of the information processing device including the multi-phase DC-DC converter according to a sixth embodiment and the load.

The multi-phase DC-DC converter according to the sixth embodiment is configured to replace the switches SWCLi (i=1 . . . N) in the second embodiment with variable gain amplifiers ACLi (i=1 . . . N). An additional component is a control voltage generating unit 16 which generates a control voltage Vcont corresponding to the load current Iload. The variable gain amplifiers adjust the gain in accordance with a value of the control voltage Vcont.

Figure 7:
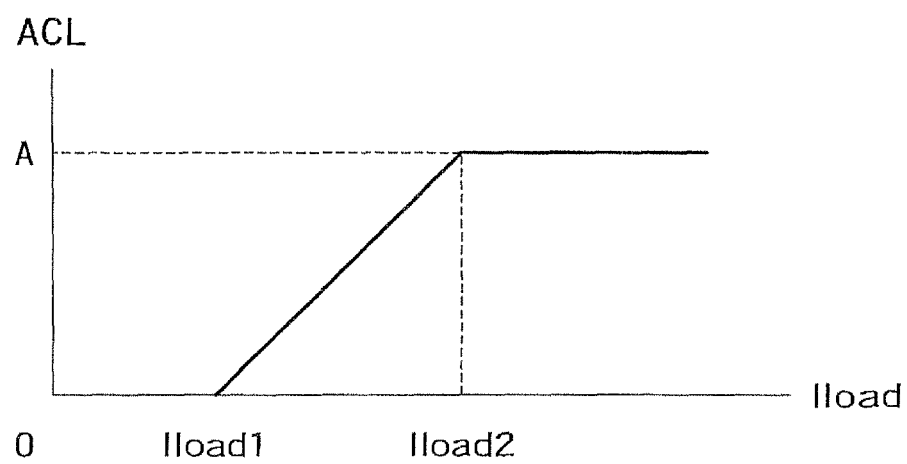
FIG. 7 is a diagram illustrating a relationship between a load current and a gain of a variable gain amplifier.

Now, an assumption is that as illustrated in FIG. 7, a gain of the variable gain amplifier is 0 when the load current is expressed such as Iload<Iload1 and is A when Iload>Iload2 but changes corresponding to the load current Iload when Iload1≤Iload≤Iload2.

If A is sufficiently large, the current feedback loop works when there flows the high-load current establishing the relationship "Iload>Iload2", and the output currents of the respective power stages are evenly controlled. The current feedback loop does not absolutely work when there flows the low-load current establishing the relationship "Iload<Iload1", and therefore the respective power stages are controlled at the same duty, with the result that the conversion efficiency is maximized. In an intermediate area where the load current comes to have the relationship such as Iload1≤Iload≤Iload2, the loop gain of the current feedback loop continuously changes with respect to Iload. Therefore, even when the load current Iload changes with the time, there is conducted a smooth transition between when the current feedback loop works and does not work, whereby it does not happen that the current value abruptly fluctuates. Thus, the output voltage can be prevented from oscillating by restraining the current loop gain from fluctuating.

It is to be noted that each embodiment discussed above has demonstrated the case of converting the input voltage into the output voltage lower than this input voltage, however, another available configuration is that the input voltage is converted into the output voltage higher than this input voltage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A DC-DC converter which converts an input voltage into an output voltage having a value different than that of the input voltage and supplies the output voltage to a load, the converter comprising:
an input terminal to receive the input voltage;
an output terminal to output the output voltage; and a plurality of power stages each including:
  a high side switch one end of which is connected to the input terminal;
  a low side switch one end of which is connected to a ground terminal and the other end of which is connected to the other end of the high side switch; and
  an inductor one end of which is connected to the other end of the high side switch and the other end of which is connected to the output terminal; and
a control unit configured to execute:
  a first mode of controlling the high side switch and the low side switch in each of the power stages so that a ratio of an output current of each of the power stages to a load current flowing through the load becomes a set value; and
  a second mode of controlling the high side switch and the low side switch in each of the power stages so that duty ratios of the high side switch and the low side switch are equalized among the power stages,
wherein the control unit executes the first mode when the load current is larger than a threshold value, and executes the second mode when the load current is equal to or smaller than the threshold value.

2. The converter according to claim 1, further comprising a terminal to receive from outside a signal indicating whether the load current is equal to or larger than the threshold value,
  wherein the control unit determines, based on the signal received by the terminal, whether the load current is larger than the threshold value.

3. The converter according to claim 1, wherein the control unit performs control in the first mode so that each of the power stages supplies the output current to the load at a same ratio to the load current.

4. The converter according to claim 1, wherein the control unit performs control in the first mode so that each power stage supplies the output current to the load at a different ratio to the load current.

5. The converter according to claim 1, wherein the control unit (i) includes a plurality of variable gain amplifiers each amplifying a signal corresponding to a difference between an average of output currents of the power stages and the output current of a respective one of the power stages, (ii) controls the high side switch and the low side switch in each of the power stages based on an addition signal obtained by adding a signal amplified by a corresponding one of the variable gain amplifiers to a difference between the output voltage and a target voltage, and (iii) controls a gain of each of the variable gain amplifiers based on the load current.

6. The converter according to claim 1, wherein the control unit executes the first mode when at least one of output currents from the power stages is equal to or larger than a threshold value, and executes the second mode when all the output currents from the power stages are smaller than the threshold value.

7. An information processing device comprising:
  the DC-DC converter according to claim 1;
  wherein the load is an electronic equipment.

8. A DC-DC converter which converts an input voltage into an output voltage having a value different than that of the input voltage and supplies the output voltage to a load, the converter comprising:
  an input terminal to receive the input voltage;
  an output terminal to output the output voltage; and
  a plurality of power stages each including:
    a high side switch one end of which is connected to the input terminal;
    a low side switch one end of which is connected to a ground terminal and the other end of which is connected to the other end of the high side switch; and
    an inductor one end of which is connected to the other end of the high side switch and the other end of which is connected to the output terminal; and
  a controller which executes one of a first mode and a second mode and which is configured to selectively switch between the first mode and the second mode;
    wherein in the first mode, the controller controls the high side switch and the low side switch in each of the power stages so that a ratio of an output current of each of the power stages to a load current flowing through the load becomes a set value; and
    wherein in the second mode, the controller controls the high side switch and the low side switch in each of the power stages so that duty ratios of the high side switch and the low side switch are equalized among the power stages,
  wherein the controller executes the first mode when the load current is larger than a threshold value, and executes the second mode when the load current is equal to or smaller than the threshold value.

9. The converter according to claim 8, further comprising a terminal to receive from outside a signal indicating whether the load current is equal to or larger than the threshold value,
  wherein the controller determines, based on the signal received by the terminal, whether the load current is larger than the threshold value.

10. The converter according to claim 8, wherein the controller performs control in the first mode so that each of the power stages supplies the output current to the load at a same ratio to the load current.

11. The converter according to claim 8, wherein the controller performs control in the first mode so that each power stage supplies the output current to the load at a different ratio to the load current.

12. The converter according to claim 8, wherein the controller (i) includes a plurality of variable gain amplifiers each amplifying a signal corresponding to a difference between an average of output currents of the power stages and the output current of a respective one of the power stages, (ii) controls the high side switch and the low side switch in each of the power stages based on an addition signal obtained by adding an amplified signal by a respective one of the variable gain amplifiers to a difference between the output voltage and a target voltage, and (iii) controls a gain of each of the variable gain amplifiers based on the load current.

* * * * *